United States Patent
Sakai et al.

[11] Patent Number: 5,891,588
[45] Date of Patent: Apr. 6, 1999

[54] LITHIUM SECONDARY BATTERY

[75] Inventors: Shigeru Sakai; Masahiro Yamamoto, both of Iwaki, Japan

[73] Assignee: Furukawa Denchi Kabushiki Kaisha, Hodogaya, Japan

[21] Appl. No.: 853,508

[22] Filed: May 8, 1997

[30] Foreign Application Priority Data

May 11, 1996 [JP] Japan .................................. 8-152832

[51] Int. Cl.$^6$ .................................................. H01M 10/40
[52] U.S. Cl. ........................... 429/332; 429/338; 429/342
[58] Field of Search ................................... 429/194, 197; 252/62.2

[56] References Cited

U.S. PATENT DOCUMENTS

| | | | |
|---|---|---|---|
| 4,550,067 | 10/1985 | Horiba et al. | 429/213 |
| 5,633,099 | 5/1997 | Yokoyama et al. | 429/194 |
| 5,659,062 | 8/1997 | Yokoyama et al. | 558/277 |

FOREIGN PATENT DOCUMENTS

| | | |
|---|---|---|
| 0 599 534 A1 | 11/1993 | European Pat. Off. . |
| 6-13109 | 1/1994 | Japan . |

OTHER PUBLICATIONS

Patent Abstracts of Japan, JP 08037025 A, Japan Energy Corp., Feb. 6, 1996.

*Primary Examiner*—Stephen Kalafut
*Attorney, Agent, or Firm*—Armstrong, Westerman, Hattori, McLeland & Naughton

[57] ABSTRACT

A lithium secondary battery including a negative electrode having has been inserted an active material at least one member selected from the group of metallic lithium, lithium alloys and materials which are capable of electrochemically occluding and releasing lithium ions; a positive electrode having an active material consisting of at least one compound which is capable of electrochemically occluding and releasing lithium ions; and an organic electrolyte. The solvent for the organic electrolyte is composed mainly of a mixture solvent prepared by mixing an organic solvent indicated by Formula I, 4-trifluoromethyl-1,3-dioxolane-2-one, and one or two selected from the group of organic solvents indicated by Formula II, 1-trifluoroethylmethyl carbonate, and an organic solvent indicated by Formula III, di-1-trifluorethyl carbonate, as mentioned below. As a result of using the solvent which contains the above-mentioned mixture solvent as a main component for the electrolyte, a lithium secondary battery with improved high-rate discharge characteristics, cycle characteristics and safety characteristics is obtained.

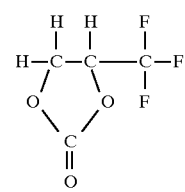

FORMULA I

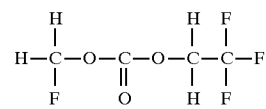

FORMULA II

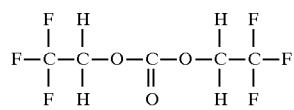

FORMULA III

4 Claims, No Drawings

LITHIUM SECONDARY BATTERY

BACKGROUND OF THE INVENTION

Field of the Invention

This invention relates to a lithium secondary battery

Description of the Related Art

With recent rapid progress in the field of electronic industries, electronic devices have been made higher in performance, smaller in size and portable. As such, the development of these devices has generated considerable demand for secondary batteries with high energy density which can be used for these electronic devices.

As a secondary battery to be used for these electronic devices, lead acid batteries, Ni-Cd (nickel-cadmium) batteries or Ni-MH (nickel-hydrogen) batteries have been conventionally used. In addition to them, lithium secondary batteries which use metallic lithium or carbon material capable of electro-chemically occluding and releasing lithium ions as an active material of a negative electrode, and oxide materials containing lithium capable of electro-chemically occluding and releasing lithium ions as an active material of a positive electrode, have been put into practice and widely used.

Lithium secondary batteries of this kind have, as compared with other conventional batteries, high discharge voltage and high energy density per unit volume or unit weight. Therefore it is said that they are the most promising secondary batteries today.

Presently, as an electrolyte used in this kind of lithium secondary batteries, there has been used a lithium salt such as $LiPF_6$, etc. dissolved in a non-aqueous mixture solvent wherein the main component is a mixture solvent of an organic solvent such as propylene carbonate, etc., which has dielectric constant, and an organic solvent such as methyl ethyl carbonate, etc., which has low viscosity. (see Tokkai-Hei 6-13109)

However, this kind of lithium secondary battery has such a problem that the organic solvents in the electrolyte is decomposed during charging, and the battery capacity is decreased by repetition of charge-discharged cycles. Therefore, the improvement in the length of battery life has been desired.

Also, since these conventional electrolytes are combustible, the lithium secondary battery using this kind of electrolyte has such dangers as firing or explosion when it is mishandled, as compared with such batteries using the aqueous electrolyte such as lead acid, Ni-Cd battery or Ni-MH battery.

SUMMARY OF THE INVENTION

An object of the present invention is to provide a lithium secondary battery which has equal or higher high-rate discharge characteristics and more excellent cycle characteristics than the conventional lithium secondary battery using the conventionally proposed electrolytes, by using an organic electrolyte including a mixture solvent which is more stable chemically and electrically as compared with the conventional electrolytes.

Another object of the present invention is to provide a lithium secondary battery which has, in addition to the excellent cycle life characteristics, a self-extinguishling characteristics of the electrolyte and is excellent in safety by limiting the electrolyte to the specific range.

To achieve one object of the present invention among the above-mentioned objects, according to the present invention, a lithium secondary battery is characterized in that a solvent for the organic electrolyte is composed mainly of a mixture solvent prepared by mixing an organic solvent indicated by formula I, 4-trifluoromethyl-1,3-dioxolane-2-one, and at least one selected from the group of organic solvents indicated by formula II, 1-trifluoroethylmethyl carbonate, and an organic solvent indicated by formula III, di-1-trifluoroethyl carbonate.

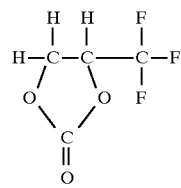

Formula I

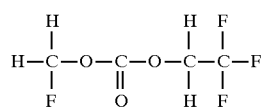

Formula II

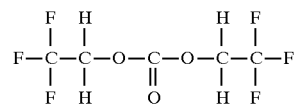

Formula III

To achieve another object of the present invention, according to the present inveritior, a lithium secondary battery is characterized in that the volume of the mixture solvent prepared by mixing the organic solvent indicated by formula I with one or two selected from the group of organic solvents indicated by furmula II and formula III whole solvent for tile organic electrolyte is 65% or more when measured under environmental temperature of 25° C., and that the volume rate of the organic solvent indicated by formula I occupied in the is at least 35% of the volume of the mixture solvent at an environmental temperature of 25° C., and thereby there is offered tile organic electrolyte having excellent self-extnguishinig and safe characteristics in addition to the excellent cycle characteristics of the battery.

Also, a lithium secondary battery, according to the present invention is characterized in that the volume of the mixture solvent prepared by mixing the organic solvent indicated by formula I with one or two selected from the group of organic solvents indicated by formula II and formula III is at least 80% of the volume of the whole solvent for the organized electrolyte at an environmental temperature of 25° C., and thereby there is offered the battery which is particularly good in cycle characteristics.

And also, a lithium secondary battery, according to the present invention is characterized in that the volume of the mixture solvent prepared by mixing the organic solvent indicated by formula I with one or two selected from the group of organic solvents indicated by formula II and formula III. is at least 80% of the volume of the whole solvent for the organic electrolyte at an environmental temperature of 25° C., and that the volume of the organic solvent indicated by formula I is 35–65 % of the volume of the mixture solvent at an environmental temperature of 25° C., and thereby there is offered one of the most preferable batteries which is particularly good in high-rate discharge characteristics and cycle characteristics and is excellent in safety.

DESCRIPTION OF THE PREFERRED EMBODIMENTS

The preferred embodiments of the present invention will be described in detail below.

A lithium secondary battery according to the present invention is similar to conventional lithium secondary batteries in constructional parts except for using an organic electrolyte prepared by dissolving at least one kind of lithium salt in a whole solvent thereby producing higher chemical and electrical stability than the conventional electrolytes.

Here, the whole solvent which has higher stability chemically and electrically than the conventional electrolytes is mainly composed of the above-mentioned mixture solvent prepared by mixing the organic solvent indicated by formula I with one or two selected from the group of the organic solvents indicated by formula II and formula III.

As for a solvent with high dielectric constant to be selectively used here, it is important that the solvent itself has high chemical and stability, but it is more important that the resultant mixture solvent prepared by mixing it with any other kind of solvent is also high in the above-mentioned stability. As a result of various and many investigations, it has been found that there is brought about excellent cycle characteristics when the mixture solvent prepared by mixing the organic solvent indicated by formula I with one kind or two selected from the group of the organic solvents indicated by formula II and formula III is used.

Specific actions for offering the foregoing excellent cycle characteristics are unknown, but it is presumed that it is due to the fact that the organic solvent itself indicated by formula I has high chemical and electrical stability and also due to the interactions between the organic solvent indicated by formula I and one or two selected from the group of the organic solvent indicated by formula II and the organic solvent indicated by formula III as resulted from the mixture thereof.

Thus, if the mixture solvent prepared by mixing the organic solvent indicated by formula I with one or two selected from the group of the organic solvents indicated by formula II and formula III is present as a main component in the whole organic solvent for the electrolyte, there is brought about the excellent cycle characteristics. In that case, the inventors have found that if the volume of the mixture solvent occupied in the whole solvent for the organic electrolyte is 65% or more when measured under environmental temperature of 25° C. and the volume of the organic solvent indicated by formula I occupied in the mixture solvent is 35% or more when measured under environmental temperature of 25° C., there can be provided a lithium secondary battery which has self-extinguishing characteristics of the electrolyte and is excellent in safety, in addition to the excellent cycle characteristics. These characteristic features are presumed to be due to the interactions between the respective solvents resulted from mixing the organic solvent indicated by formula I and one or two selected form the group of the organic solvents indicated by formula II and formula III.

Thus, if the mixture solvent prepared by mixing the organic solvent indicated by formula I with one or two selected from the group of the organic solvents indicated by formula II and formula III is present as a main component for the whole solvent, there can be an excellent cycle characteristics. Furthermore, the inventors also have found that if the volume of the mixture solvent occupied in the whole solvent for the organic electrolyte is 80% or more when measured under environmental temperature of 25° C., there can be obtained a lithium secondary battery which is especially excellent in cycle characteristics. The inventors assume that the reason for this is because the actions (influence(s)) of other solvent(s) than the solvents indicated by formulas I, II and III are hardly presented under environmental temperature of 25° C. if the volume of the mixture solvent in the whole solvent is 80% or more.

Here, solvents used in the electrolyte other than the solvents indicated by formulas I, II and III can be, for example, cyclic esters such as propylene carbonate, ethylene carbonate, butylene carbonate, γ-butyrolactone, vinylene carbonate, 2-methyl-γ-butyrolactone, acetyl-γ-butyrolactone and γ-valerolactone, chain esters such as dimethyl carbonate, methyl ethyl carbonate, propyl methyl carbonate, methyl butyl carbonate, diethyl carbonate, propyl ethyl carbonate, ethyl butyl carbonate, dipropyl carbonate, butyl propyl carbonate, dibutyl carbonate, alkyl propionates ester, dialkyl malonates ester and alkyl acetate ester, cyclic ethers such as alkyl acetates, tetrahydrofuran, alkyl tetrahydrofuran, dialkyl tetrahydrofuran, alkoxy tetrahydrofuran, dialkoxy tetrahydrofuran, 1,3-dioxolane, alkyl-1,3-dioxolane, 1,4-dioxolane, etc. and chain ethers such as 1,2-dimethoxyethane, 1,2-diethoxyethane, diethyl ether, ethylene glycol dialkyl ether, diethylene glycol dialkyl ether, triethylene glycol dialkyl ether and tetraethylene glycol dialkyl ether. However, it is not necessary to be limited to the solvents as listed above.

Thus, if the mixture solvent prepared by mixing the organic solvent indicated by formula I with one or two selected from the group of the organic solvents indicated by formula II and formula III is present in the whole solvent as main component, there is brought about excellent characteristics. Further, the inventors have also found that it is preferable that the volume of the mixture solvent occupied in the whole solvent for the organic electrolyte is 80% or more when measured under environmental temperature of 25° C., and the volume of the organic solvent indicated by formula I occupied in the mixture solvent is 35–65% when measured under environmental temperature condition of 25° C. In more detail, the inventors have found that especially when the volume of the organic solvent indicated by formula I is limited in the above range, there can be obtained a lithium secondary battery which has an especially high specific electric conductivity, and thus there can be obtained a large discharge capacity even if it is discharged with a current in a wide range of 0.2CA–2.5CA, in addition to the especially excellent cycle characteristics and a high safety resulted from the self-extinguishing characteristics of the electrolyte. And, if the foregoing volume of the organic solvent indicated by formula I is less than 35%, the lithium salt can not be dissociated sufficiently, resulting in decrease in the specific electric conductivity and increase in the internal resistance of the battery, so that it becomes difficult to take out a sufficient capacity. On the other hand, if the volume thereof is more than 65%, the viscosity of the electrolyte is increased, resulting in decrease in mobility of lithium ions and decrease in the specific conductivity and increase in the internal resistance.

As to lithium salts to be dissolved in the whole solvent for the electrolyte, any kind which is capable of dissociating in the organic solvent and releasing lithium ions can be used. For example, there are inorganic lithium salt such as $LiClO_4$, $LiBF_4$, $LiPF_6$, $LiAsF_6$, $LiCl$, $LiBr$ etc., and organic lithium salt such as $LiB(C_6H_5)_4$, $LiN(SO_4CF_3)_2$, $LiC(SO_2CF_3)_3$, $LiOSO_2CF_3$ etc. Among the above lithium salts, fluorine-containing lithium salts are preferable in terms of safety, and especially $LiPF_6$ alone or a mixture composed mainly of $LiPF_6$ mixed with any other lithium salt(s) are preferable because of its high electro-conductivity.

The active materials to be used for the positive electrode are, for example, lithium-containing complex oxides such as $LiCoO_2$, $LiNiO_2$, $LiMnO_2$ or $LiMn_2O_4$, etc., or chalcogen compounds such as $TiO_2$, $MnO_2$, $MoO_3$, $V_2O_5$, $TiS_2$, $MoS_2$, etc. Specially, a lithium compound having a structure of $\alpha$-$NaCrO_2$ such as $LiCoO_2$, $LiNiO_2$, $LiMnO_2$ etc. or $LiMn_2O_4$ etc. are more preferable because of its high discharge voltage and electro-chemical stability.

EMBODIMENT EXAMPLES

The embodiment examples of the present invention will be explained concretely as follows, but the present invention is not to limit to them.

$LiCoO_2$ powder as an active material for a positive electrode, graphite powder as an electro-conductive agent, polyflouoro vinylidene resin as a binder, and N-methyl-2-pyrrolidone as a solvent for the binder were stirred to be mixed by a homogenizer to obtain a slurry active material mixture for a positive electrode. One side of an electric collector made of aluminum foil was coated with this slurry mixture using a slot die coater, and thereafter dried at 130° C. in an oven to remove the solvent. The other side of the electric collector was coated therewith, and thereafter the solvent was removed by the same manner as above in order to coat both sides of the electric collector with active material mixture. Then, it was pressed with a roller press and heated in a vacuum oven to remove the moisture to obtain a positive electrode.

On the other hand, a negative electrode was made in such a manner that carbon powder capable of electro-chemically occluding and releasing lithium ions, styrene butadiene rubber type resin and ethyl acetate was stirred to be mixed by a homogenizer to obtain a slurry active material mixture. This slurry active material mixture coated on one side of an electric collector made of copper foil using a slot die coater, and thereafter it was dried in an oven at 130° C. to remove the solvent. The other side of the electric collector was also coated therewith and the solvent was removed in the same manner as above. The electric collector with the active material mixture on both sides thereof thus obtained was then subjected to a heat treatment so as to cure styrene butadiene rubber type resin, and then pressed with a heated roller press and was then dried to remove the moisture to obtain a negative electrode.

1. Evaluation of Cycle Characteristics

The positive electrode and the negative electrode thus obtained were stacked one upon another through a separator made of micro porous resin film which has a three-dimensional (sponge-like) structured polyolefin resins ( polyethylene, polypropylene or a copolymer thereof), and it was wound to form a spiral electrode assembly; The spiral electrode assembly thus obtained was put in a tubular container made of stainless steel. Tile opening of the container was closed with a cover, and after an electrolyte was poured, to obtain a sealed lithium secondary battery of AA-size with 500 mAh rated capacity.

In the course of manufacturing a lot of the foregoing batteries, the batteries were poured with respective electrolytes prepared by dissolving $LiPF_6$ as a solute in the respective whole solvents for the electrolytes corresponding to examples A–AG, comparative example A and conventional examples A–C having the respective compositions in the volume ratios of component solvents, when measured at 25° C. as shown in Table 1 , so as to become the concentration of the solute 1 mol/l.

In Table 1, [A] represents the volume percentage of the mixture solvent prepared by mixing the organic solvent indicated by formula I with one kind or two selected from the group of the organic solvents indicated by formulas II and III occupied in the whole solvent at temperature of 25° C. [B] represents the volume percentage of other solvents than the organic solvents indicated by formulas I, II and III occupied in the whole solvent at a temperature of 25° C. [A1] represents the volume percentage of the organic solvent indicated by formula I occupied in the mixture solvent of the organic solvents indicated by formulas I, II and III at a temperature of 25° C. [A2] represents the volume percentage of one or two selected from the group of the organic solvents indicated by formulas II and III occupied in the mixture solvent of the organic solvents indicated by formulas I, II and III at a temperature of 25° C. [II] represents the volume percentage of the organic solvent indicated by formula II occupied in the mixture solvent indicated by formulas II and III at a temperature of 25° C. [III] represents the volume percentage of the organic solvent indicated by formula III occupied in the mixture solvent indicated by formulas II and III at a temperature of 25° C. Further, PC stands for propylene carbonate and MEC stands for methyl ethyl carbonate.

TABLE 1

Composition of solvents for electrolytes (volume %)

| | [A] | | | [B] | |
|---|---|---|---|---|---|
| | | Composition of [A] | | | |
| | | | [A2] | | |
| | | | Composition of [A2] | | Composition of [B] |
| | [A1] | [II] | [III] | PC | MEC |
| Example A | 50 | 50 | 50 | 100 | 0 | 50 | 100 | 0 |
| Example B | 60 | 50 | 50 | 100 | 0 | 40 | 100 | 0 |
| Example C | 70 | 50 | 50 | 100 | 0 | 30 | 100 | 0 |
| Example D | 80 | 50 | 50 | 100 | 0 | 20 | 100 | 0 |
| Example E | 90 | 50 | 50 | 100 | 0 | 10 | 100 | 0 |
| Example F | 100 | 50 | 50 | 100 | 0 | 0 | — | — |
| Example G | 50 | 50 | 50 | 0 | 100 | 50 | 0 | 100 |
| Example H | 60 | 50 | 50 | 0 | 100 | 40 | 0 | 100 |
| Example I | 70 | 50 | 50 | 0 | 100 | 30 | 0 | 100 |
| Example J | 80 | 50 | 50 | 0 | 100 | 20 | 0 | 100 |
| Example K | 90 | 50 | 50 | 0 | 100 | 10 | 0 | 100 |
| Example L | 100 | 50 | 50 | 0 | 100 | 0 | — | — |
| Example M | 50 | 50 | 50 | 50 | 50 | 50 | 50 | 50 |
| Example N | 60 | 50 | 50 | 50 | 50 | 40 | 50 | 50 |
| Example O | 70 | 50 | 50 | 50 | 50 | 30 | 50 | 50 |
| Example P | 80 | 50 | 50 | 50 | 50 | 20 | 50 | 50 |
| Example Q | 90 | 50 | 50 | 50 | 50 | 10 | 50 | 50 |
| Example R | 100 | 50 | 50 | 50 | 50 | 0 | — | — |
| Example S | 100 | 30 | 70 | 100 | 0 | 0 | — | — |
| Example T | 100 | 35 | 65 | 100 | 0 | 0 | — | — |
| Example U | 100 | 55 | 45 | 100 | 0 | 0 | — | — |
| Example V | 100 | 65 | 35 | 100 | 0 | 0 | — | — |
| Example W | 100 | 70 | 30 | 100 | 0 | 0 | — | — |
| Example X | 80 | 30 | 70 | 0 | 100 | 20 | 50 | 50 |
| Example Y | 80 | 35 | 65 | 0 | 100 | 20 | 50 | 50 |
| Example Z | 80 | 55 | 45 | 0 | 100 | 20 | 50 | 50 |
| Example AA | 80 | 65 | 35 | 0 | 100 | 20 | 50 | 50 |
| Example AB | 80 | 70 | 30 | 0 | 100 | 20 | 50 | 50 |
| Example AC | 70 | 30 | 70 | 50 | 50 | 30 | 50 | 50 |
| Example AD | 70 | 35 | 65 | 50 | 50 | 30 | 50 | 50 |
| Example AE | 70 | 55 | 45 | 50 | 50 | 30 | 50 | 50 |
| Example AF | 70 | 65 | 35 | 50 | 50 | 30 | 50 | 50 |
| Example AG | 70 | 70 | 30 | 50 | 50 | 30 | 50 | 50 |
| Comparative example A | 50 | 100 | 0 | — | — | 50 | 0 | 100 |
| Conventional example A | 0 | — | — | — | — | 100 | 50 | 50 |
| Conventional example B | 50 | 0 | 100 | 100 | 0 | 50 | 100 | 0 |
| Conventional example C | 50 | 0 | 100 | 0 | 100 | 50 | 100 | 0 |

Each of the batteries thus manufactured was charged and discharged repeatedly 10 cycles for the initial activation in such a manner that it was charged with a current density of 0.2 CmA, at a temperature of 25° C. until the battery voltage reached 4.2 V, and after allowed to stand for ten minutes, it was discharged with the same current as above until the battery voltage became 2.75 V, and it was then allowed to stand for ten minutes, and the same charging as above was carried out again. Thereafter, for measuring the cycle characteristics, a life test was carried out for each of the batteries in such a manner that it was charged with a current of 0.2 CmA, at a temperature of 25° C., until the battery voltage reached 4.2 V, and after it was allowed to stand for ten minutes, it was discharged with a current of 0.7 CmA until the battery voltage became 2.75 V, and after, it was allowed to stand for ten minutes, the same charging was carried out again. Here, the battery life is determined by the number of charge/discharge cycles counted until a discharge capacity of the each battery has been reduced to 70% of the discharge capacity thereof at the first cycle in the life test. The result thereof is show in Table 2 below.

TABLE 2

|  | Battery life (cycle) |
|---|---|
| Example A | 388 |
| Example B | 432 |
| Example C | 478 |
| Example D | 547 |
| Example E | 591 |
| Example F | 589 |
| Example G | 368 |
| Example H | 399 |
| Example I | 444 |
| Example J | 532 |
| Example K | 544 |
| Example L | 547 |
| Example M | 373 |
| Example N | 411 |
| Example O | 427 |
| Example P | 502 |
| Example Q | 531 |
| Example R | 575 |
| Example S | 523 |
| Example T | 547 |
| Example U | 576 |
| Example V | 532 |
| Example W | 528 |
| Example X | 500 |
| Example Y | 512 |
| Example Z | 538 |
| Example AA | 535 |
| Example AB | 421 |
| Example AC | 392 |
| Example AD | 434 |
| Example AE | 428 |
| Example AF | 409 |
| Example AG | 367 |
| Comparative example A | 323 |
| Conventional example A | 286 |
| Conventional example B | 345 |
| Conventional example C | 307 |

Examples A–AG which are the batteries made according to the present invention exhibit longer in life as compared with conventional examples A–C which are conventionally made batteries and with comparative example A which is a battery made for comparison. Accordingly, it has been found therefrom that the electrolytes according to the present invention are effective in improving the cycle characteristics of the lithium secondary batteries.

Furthermore, especially, examples D–F, examples J–L and examples P–R, among examples A–R, in which the volume percentage of the mixture solvent prepared by mixing the organic solvent indicated by formula I with one or two selected from the group of the organic solvents indicated by formula II and formula III are 80% or more of the whole solvent under environmental condition of 25° C., exhibit more than 500 cycles which prove longer life than the other examples each in which the volume percentage thereof is less than 80%. Also, it has been found therefrom that if the volume percentage of the mixture solvent prepared by mixing the organic solvent indicated by formula I with one or two selected from the group of the organic solvents indicated by formula II and formula III is 80% or more of the whole solvent under environmental condition of 25° C., it is much effective in improvement in the cycle characteristics of the lithium secondary batteries.

2. Evaluation of Discharge Capacity

The above-mentioned positive electrode and negative electrode were stacked one upon another through a separator made of a microporous resin film having a three dimensional sponge-like structure of such a polyolefine resin as polyethylene, polypropylene or a copolymer thereof, and it was wound to form a spiral electrode assembly. The spiral electrode assembly thus obtained was put in a tubular container made of stainless steel. The opening of the container was closed with a cover, after an electrolyte was poured, to obtain a lithium secondary battery of AA-size.

In the course of manufacturing a lot of the foregoing batteries, the batteries were poured with respective electrolytes prepared by dissolving $LiPF_6$ as a solute in the respective whole solvent for the electrolyte corresponding to examples F, L and R-AG and conventional example A having the respective compositions in the volume ratios of the component solvents when measured at 25° C. as shown in Table 1, so as to become the concentration of the solute 1 mol/l.

Each of the batteries thus manufactured was charged and discharged repeatedly 10 cycles for the initial activation in such a manner that it was charged with a current of 0.2 CmA, at a temperature of 25° C. until the battery voltage reached 4.2 V, and afterward allowed to stand for ten minutes, it was discharged with the same current as above until the battery voltage became 2.75 V, and after it was allowed to stand for ten minutes, the same charging as above was carried out again. Thereafter, a discharge capacity test was carried out for each battery in such a manner that it was charged with a current of 0.2 CmA, at a temperature of 25° C., until the battery voltage reached 4.2 V, and after it was allowed to stand for ten minutes, it was discharged with a current of 10 mA until the battery voltage became 2.75 V. The result of measuring the discharge capacity of each battery is shown in Table 3 below. Those lithium secondary batteries were so designed as to obtain the same capacity by including the same amounts of the active materials in the positive and negative electrodes.

TABLE 3

|  | Discharge Capacity (mAh) |  | Discharge Capacity (mAh) |
|---|---|---|---|
| Example F | 532 | Example Z | 513 |
| Example L | 524 | Example AA | 501 |
| Example R | 500 | Example AB | 466 |
| Example S | 468 | Example AC | 483 |
| Example T | 519 | Example AD | 510 |
| Example U | 507 | Example AE | 507 |
| Example V | 500 | Example AF | 503 |
| Example W | 466 | Example AG | 471 |
| Example X | 471 | Conventional Example A | 467 |
| Example Y | 512 |  |  |

It has been found therefrom that examples F, L and R-AG, which are the batteries made according to the present invention, are all provided with equal or more discharge capacity to or than the conventional batteries and enough to be acceptable as a practical use, in spite of such a large discharge current that is 1CA, and especially, examples F, L, R, T-V, Y-MA and AD-AF, in which the volume percentage of the mixture solvent prepared by mixing the organic solvent indicated by formula I with one or two selected from the group of the organic solvents indicated by formulas II and III is more 80% or more of the whole solvent, when measured under environmental temperature of 25° C., and the volume percentage of the organic solvent indicated by formula I occupied in the mixture solvent prepared by mixing the organic solvent indicated by formula I with one kind or two selected from the group of the organic solvents indicated by formulas II and III is in the range of 35–65% when measured under environmental temperature of 25° C., exhibit such a large discharge capacity that is more than 500 mAh, and thus there can be obtained lithium secondary batteries which are excellent also in the high-rate discharge characteristics, in addition to the above-mentioned much excellent cycle characteristics.

3. Evaluation of Self-Extinguishing Characteristics

The following test was carried out for confirming self-extinguish characteristics of the electrolytes used for the batteries of the present invention.

Various electrolytes were prepared by dissolving $LiPF_6$ as a solute in the respective whole solvent corresponding to the example AH–ER having the respective composition in the volume ratios of the component solvents at 25° C. as shown in Table 4, so as to become the concentration of the solute 1 mol/l. Here, in Table 4, [A], [B], [A1], [A2], [II], and [III] respectively represent the same as in Table 1. PC stands for propylene carbonate and MEC stands for methyl ethyl carbonate.

TABLE 4

Composition of solvents for electrolytes (volume %)

| | Composition of [A] | | | | | |
|---|---|---|---|---|---|---|
| | | | Composition of [A2] | | | kind of |
| [A] | [A1] | [A2] | [II] | [III] | [B] | solvent |
| Example AH | 65 | 35 | 65 | 100 | 0 | 35 | PC |
| Example AI | 70 | 35 | 65 | 100 | 0 | 30 | PC |
| Example AJ | 80 | 35 | 65 | 100 | 0 | 20 | PC |
| Example AK | 90 | 35 | 65 | 100 | 0 | 10 | PC |
| Example AL | 65 | 35 | 65 | 0 | 100 | 35 | PC |
| Example AM | 70 | 35 | 65 | 0 | 100 | 30 | PC |
| Example AN | 80 | 35 | 65 | 0 | 100 | 20 | PC |
| Example AO | 90 | 35 | 65 | 0 | 100 | 10 | PC |
| Example AP | 100 | 35 | 65 | 0 | 100 | 0 | — |
| Example AQ | 65 | 35 | 65 | 50 | 50 | 35 | PC |
| Example AR | 70 | 35 | 65 | 50 | 50 | 30 | PC |
| Example AS | 80 | 35 | 65 | 50 | 50 | 20 | PC |
| Example AT | 90 | 35 | 65 | 50 | 50 | 10 | PC |
| Example AU | 100 | 35 | 65 | 50 | 50 | 0 | — |
| Example AV | 65 | 35 | 65 | 100 | 0 | 35 | MEC |
| Example AW | 70 | 35 | 65 | 100 | 0 | 30 | MEC |
| Example AX | 80 | 35 | 65 | 100 | 0 | 20 | MEC |
| Example AY | 90 | 35 | 65 | 100 | 0 | 10 | MEC |
| Example AZ | 65 | 35 | 65 | 0 | 100 | 35 | MEC |
| Example BA | 70 | 35 | 65 | 0 | 100 | 30 | MEC |
| Example BB | 80 | 35 | 65 | 0 | 100 | 20 | MEC |
| Example BC | 65 | 35 | 65 | 50 | 50 | 35 | MEC |
| Example BD | 70 | 35 | 65 | 50 | 50 | 30 | MEC |
| Example BE | 80 | 35 | 65 | 50 | 50 | 20 | MEC |
| Example BF | 100 | 35 | 65 | 50 | 50 | 0 | — |
| Example BG | 65 | 50 | 50 | 100 | 0 | 35 | PC |
| Example BH | 65 | 50 | 50 | 0 | 100 | 35 | PC |
| Example BI | 70 | 50 | 50 | 0 | 100 | 30 | PC |
| Example BJ | 80 | 50 | 50 | 0 | 100 | 20 | PC |
| Example BK | 90 | 50 | 50 | 0 | 100 | 10 | PC |
| Example BL | 65 | 50 | 50 | 50 | 50 | 35 | PC |
| Example BM | 70 | 50 | 50 | 50 | 50 | 30 | PC |
| Example BN | 80 | 50 | 50 | 50 | 50 | 20 | PC |
| Example BO | 90 | 50 | 50 | 50 | 50 | 10 | PC |
| Example BP | 65 | 50 | 50 | 100 | 0 | 35 | MEC |
| Example BQ | 70 | 50 | 50 | 100 | 0 | 30 | MEC |
| Example BR | 80 | 50 | 50 | 100 | 0 | 20 | MEC |
| Example BS | 90 | 50 | 50 | 100 | 0 | 10 | MEC |
| Example BT | 65 | 50 | 50 | 0 | 100 | 35 | MEC |
| Example BU | 65 | 50 | 50 | 50 | 50 | 35 | MEC |
| Example BV | 70 | 50 | 50 | 50 | 50 | 30 | MEC |
| Example BW | 50 | 50 | 50 | 50 | 50 | 20 | MEC |
| Example BX | 90 | 50 | 50 | 50 | 50 | 10 | MEC |
| Example BY | 65 | 60 | 40 | 100 | 0 | 35 | PC |
| Example BZ | 70 | 60 | 40 | 100 | 0 | 30 | PC |
| Example CA | 80 | 60 | 40 | 100 | 0 | 20 | PC |
| Example CB | 90 | 60 | 40 | 100 | 0 | 10 | PC |
| Example CC | 100 | 60 | 40 | 100 | 0 | 0 | — |
| Example CD | 65 | 60 | 40 | 0 | 100 | 35 | PC |
| Example CE | 70 | 60 | 40 | 0 | 100 | 30 | PC |
| Example CF | 80 | 60 | 40 | 0 | 100 | 20 | PC |
| Example CG | 90 | 60 | 40 | 0 | 100 | 10 | PC |
| Example CH | 100 | 60 | 40 | 0 | 100 | 0 | — |
| Example CI | 65 | 60 | 40 | 50 | 50 | 35 | PC |
| Example CJ | 70 | 60 | 40 | 50 | 50 | 30 | PC |
| Example CK | 80 | 60 | 40 | 50 | 50 | 20 | PC |
| Example CL | 90 | 60 | 40 | 50 | 50 | 10 | PC |
| Example CM | 100 | 60 | 40 | 50 | 50 | 0 | — |
| Example CN | 65 | 60 | 40 | 100 | 0 | 35 | MEC |
| Example CO | 70 | 60 | 40 | 100 | 0 | 30 | MEC |
| Example CP | 80 | 60 | 40 | 100 | 0 | 20 | MEC |
| Example CQ | 90 | 60 | 40 | 100 | 0 | 10 | MEC |
| Example CR | 65 | 60 | 40 | 0 | 100 | 35 | MEC |
| Example CS | 70 | 60 | 40 | 0 | 100 | 30 | MEC |
| Example CT | 80 | 60 | 40 | 0 | 100 | 20 | MEC |
| Example CU | 90 | 60 | 40 | 0 | 100 | 10 | MEC |
| Example CV | 65 | 60 | 40 | 50 | 50 | 35 | MEC |
| Example CW | 70 | 60 | 40 | 50 | 50 | 30 | MEC |
| Example CX | 80 | 60 | 40 | 50 | 50 | 20 | MEC |
| Example CY | 90 | 60 | 40 | 50 | 50 | 10 | MEC |
| Example CZ | 65 | 80 | 20 | 100 | 0 | 35 | PC |
| Example DA | 70 | 80 | 20 | 100 | 0 | 30 | PC |
| Example DB | 80 | 80 | 20 | 100 | 0 | 20 | PC |
| Example DC | 90 | 80 | 20 | 100 | 0 | 10 | PC |
| Example DD | 100 | 80 | 20 | 100 | 0 | 0 | — |
| Example DE | 65 | 80 | 20 | 0 | 100 | 35 | PC |
| Example DF | 70 | 80 | 20 | 0 | 100 | 30 | PC |
| Example DG | 80 | 80 | 20 | 0 | 100 | 20 | PC |
| Example DH | 90 | 80 | 20 | 0 | 100 | 10 | PC |
| Example DI | 100 | 80 | 20 | 0 | 100 | 0 | — |
| Example DJ | 65 | 80 | 20 | 50 | 50 | 35 | PC |
| Example DK | 70 | 80 | 20 | 50 | 50 | 30 | PC |
| Example DL | 80 | 80 | 20 | 50 | 50 | 20 | PC |
| Example DM | 90 | 80 | 20 | 50 | 50 | 10 | PC |
| Example DN | 100 | 80 | 20 | 50 | 50 | 0 | — |
| Example DO | 65 | 80 | 20 | 100 | 0 | 35 | MEC |
| Example DP | 70 | 80 | 20 | 100 | 0 | 30 | MEC |
| Example DQ | 80 | 80 | 20 | 100 | 0 | 20 | MEC |
| Example DR | 90 | 80 | 20 | 100 | 0 | 10 | MEC |
| Example DS | 65 | 80 | 20 | 0 | 100 | 35 | MEC |
| Example DT | 70 | 80 | 20 | 0 | 100 | 30 | MEC |
| Example DU | 80 | 80 | 20 | 0 | 100 | 20 | MEC |
| Example DV | 90 | 80 | 20 | 0 | 100 | 10 | MEC |
| Example DW | 65 | 80 | 20 | 50 | 50 | 35 | MEC |
| Example DX | 70 | 80 | 20 | 50 | 50 | 30 | MEC |
| Example DY | 80 | 80 | 20 | 50 | 50 | 20 | MEC |
| Example DZ | 90 | 80 | 20 | 50 | 50 | 10 | MEC |

TABLE 4-continued

Composition of solvents for electrolytes (volume %)

| | Composition of [A] | | | | [B] | kind of solvent |
|---|---|---|---|---|---|---|
| | | Composition of [A2] | | | | |
| | [A] | [A1] | [A2] | [II] | [III] | | |
| Example EA | 60 | 35 | 65 | 100 | 0 | 40 | PC |
| Example EB | 60 | 35 | 65 | 0 | 100 | 40 | PC |
| Example EC | 60 | 35 | 65 | 50 | 50 | 40 | PC |
| Example ED | 60 | 35 | 65 | 100 | 0 | 40 | MEC |
| Example EE | 60 | 35 | 65 | 0 | 100 | 40 | MEC |
| Example EF | 60 | 35 | 65 | 50 | 50 | 40 | MEC |
| Example EG | 65 | 30 | 70 | 100 | 0 | 35 | PC |
| Example EH | 65 | 30 | 70 | 0 | 100 | 35 | PC |
| Example EI | 65 | 30 | 70 | 50 | 50 | 35 | PC |
| Example EJ | 65 | 30 | 70 | 100 | 0 | 35 | MEC |
| Example EK | 65 | 30 | 70 | 0 | 100 | 35 | MEC |
| Example EL | 65 | 30 | 70 | 50 | 50 | 35 | MEC |
| Example EM | 60 | 30 | 70 | 100 | 0 | 40 | PC |
| Example EN | 60 | 30 | 70 | 0 | 100 | 40 | PC |
| Example EO | 60 | 30 | 70 | 50 | 50 | 40 | PC |
| Example EP | 60 | 30 | 70 | 100 | 0 | 40 | MEC |
| Example EQ | 60 | 30 | 70 | 0 | 100 | 40 | MEC |
| Example ER | 60 | 30 | 70 | 50 | 50 | 40 | MEC |

Also, various mixture electrolytes were prepared by dissolving $LiPF_6$ as a solute in the respective whole solvents for the electrolytes corresponding to examples C, D, E, F, L, R and T, comparative example A, and conventional examples A–C having the respective compositions in the volume ratios of the component solvents as shown in Table 1, so as to adjust the solute concentration to 1 mol/l.

Self-extinguishing characteristics of each of the electrolytes prepared as above was examined by a test where sheets of paper were immersed in the respective electrolytes to be tested, and were then set fire by a flame of a burner and thereafter the flame was put out. Thus the self-extinguishing characteristics was confirmed by observing as to whether the firing was still continued or discontinued when the flame was put out. The results of self-extinguishing characteristics are shown in Table 5 below.

TABLE 5

| | fire continued/discontinued | | fire continued/discontinued |
|---|---|---|---|
| Example AH | fire discontinued | Example BI | fire discontinued |
| Example AI | fire discontinued | Example BJ | fire discontinued |
| Example AJ | fire discontinued | Example BK | fire discontinued |
| Example AK | fire discontinued | Example BL | fire discontinued |
| Example AL | fire discontinued | Example BM | fire discontinued |
| Example AM | fire discontinued | Example BN | fire discontinued |
| Example AN | fire discontinued | Example BO | fire discontinued |
| Example AO | fire discontinued | Example BP | fire discontinued |
| Example AP | fire discontinued | Example BQ | fire discontinued |
| Example AQ | fire discontinued | Example BR | fire discontinued |
| Example AR | fire discontinued | Example BS | fire discontinued |
| Example AS | fire discontinued | Example BT | fire discontinued |
| Example AT | fire discontinued | Example BU | fire discontinued |
| Example AU | fire disconiinued | Example BV | fire discontinued |
| Example AV | fire discontinued | Example BW | fire discontinued |
| Example AW | fire discontinued | Example BX | fire discontinued |
| Example AX | fire discontinued | Example BY | fire discontinued |
| Example AY | fire discontinued | Example BZ | fire discontinued |
| Example AZ | fire discontinued | Example CA | fire discontinued |
| Example BA | fire discontinued | Example CB | fire discontinued |
| Example BB | fire discontinued | Example CC | fire discontinued |
| Example BC | fire discontinued | Example CD | fire discontinued |
| Example BD | fire discontinued | Example CE | fire discontinued |
| Example BE | fire discontinued | Example CF | fire discontinued |
| Example BF | fire discontinued | Example CG | fire discontinued |
| Example BG | fire discontinued | Example CH | fire discontinued |
| Example BH | fire discontinued | Example CI | fire discontinued |
| Example CJ | fire discontinued | Example DV | fire discontinued |
| Example CK | fire discontinued | Example DW | fire discontinued |
| Example CL | fire discontinued | Example DX | fire discontinued |
| Example CM | fire discontinued | Example DY | fire discontinued |
| Example CN | fire discontinued | Example DZ | fire discontinued |
| Example CO | fire discontinued | Example EA | fire continued |
| Example CP | fire discontinued | Example EB | fire continued |
| Example CQ | fire discontinued | Example EC | fire continued |
| Example CR | fire discontinued | Example ED | fire continued |
| Example CS | fire discontinued | Example EE | fire continued |
| Example CT | fire discontinued | Example FE | fire continued |
| Example CU | fire discontinued | Example EG | fire continued |
| Example CV | fire discontinued | Example EH | fire continued |
| Example CW | fire discontinued | Example EI | fire continued |
| Example CX | fire discontinued | Example EJ | fire continued |
| Example CY | fire discontinued | Example EK | fire continued |
| Example CZ | fire discontinued | Example EL | fire continued |
| Example DA | fire discontinued | Example EM | fire continued |
| Example DB | fire discontinued | Example EN | fire continued |
| Example DC | fire discontinued | Example EO | fire continued |
| Example DD | fire discontinued | Example EP | fire continued |
| Example DE | fire discontinued | Example EQ | fire continued |
| Example DF | fire discontinued | Example ER | fire continued |
| Example DG | fire discontinued | Example C | fire discontinued |
| Example DH | fire discontinued | Example D | fire discontinued |
| Example DI | fire discontinued | Example E | fire discontinued |
| Example DJ | fire discontinued | Example F | fire discontinued |
| Example DK | fire discontinued | Example I | fire discontinued |
| Example DL | fire discontinued | Example J | fire discontinued |
| Example DM | fire discontinued | Example K | fire discontinued |
| Example DN | fire discontinued | Example L | fire discontinued |
| Example DO | fire discontinued | Example R | fire discontinued |
| Example DP | fire discontinued | Example T | fire discontinued |
| Example DQ | fire discontinued | Comparative Example A | fire continued |
| Example DR | fire discontinued | Conventional Example A | fire continued |
| Example DS | fire discontinued | Conventional Example B | fire continued |
| Example DT | fire discontinued | Conventional Example C | fire continued |
| Example DU | fire discontinued | | |

As it is obvious from Table 5, while the electrolytes corresponding to conventional examples A–C and comparative example A continued firing even after putting out the burner's flame, the electrolytes corresponding to examples AH–DZ and examples and C, D, E, F, L, R and T used for the battery according to the present invention self-extinguished after putting out the burner's flame, and thus their self-extinguishing characteristics have been confirmed. However, it has been also confirmed that the electrolytes corresponding to examples EA–ER have no self-extinguish characteristics, because the firing thereof continued even after putting out the burner's flame. Therefore, it has been concluded that the electrolytes wherein the volume percentage of the mixture solvent prepared by mixing the organic solvent indicated by formula I with one or two selected from the group of the organic solvents indicated by formula II and formula III is 65% or more of the whole solvent when measured under environmental temperature of 25° C., and the volume percentage of the organic solvent indicated by formula I is 35% or more of the mixture solvent, when measured under environmental temperature of 25° C., have more improved in self-extinguishing characteristics. Using such a specific range of electrolyte, a lithium secondary battery with high safety characteristics can be supplied.

Thus, according to the present invention, a lithium battery with excellent charge/discharge cycle characteristics can be obtained. Furthermore, by limiting the mixing ratios of the mixture solvent in the electrolyte in the foregoing range, a lithium secondary battery which is provided with high safety and self-extinguishing characteristics in addition to the excellent cycle characteristics can be obtained. In addition, a lithium secondary battery provided also with high-rate discharge characteristics can be obtained.

What is claimed are:

1. An improved lithium secondary battery, comprising:
    a negative electrode using as an active material at least one member selected from the group consisting of metallic lithium, lithium alloys and materials which are capable of electrochemically occluding and releasing lithium ions;
    a positive electrode using as an active material at least one compound which is capable of electrochemically occluding and releasing lithium ions; and
    an organic electrolyte comprising a lithium salt dissolved in a solvent composition,
    wherein said solvent composition for the organic electrolyte comprises a solvent mixture prepared by mixing (1) an organic solvent represented by Formula I, which is 4-trifluoromethyl-1,3-dioxolane-2-one, and (2) at least one member selected from the group consisting of an organic represented by Formula II, which is 1-trifluoroethylmethyl carbonate, and an organic solvent represented by Formula III, which is trifluoroethyl carbonate:

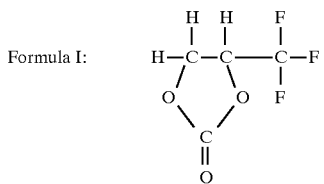

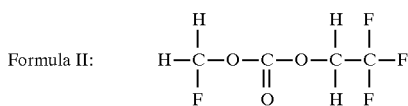

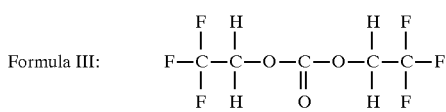

2. The improved lithium secondary battery according to claim 1, wherein the volume of the solvent mixture is at least 65% of the volume of the solvent composition for the organic electrolyte at an environmental temperature of 25° C., and the volume of the organic solvent represented by Formula I is at least 35% of the volume of the solvent mixture at an environmental temperature of 25° C.

3. The improved lithium secondary battery according to claim 1 or claim 2, wherein the volume of the solvent mixture is at least 80% of the volume of the solvent composition for the organic electrolyte at an environmental temperature of 25° C.

4. The improved lithium secondary battery according to claim 1 or claim 2, wherein the volume of the solvent mixture is at least 80% of the volume of the solvent composition for the organic electrolyte at an environmental temperature of 25° C., and the volume of the organic solvent represented by Formula I is 35–65% of the volume of the solvent mixture at environmental temperature of 25° C.

* * * * *

UNITED STATES PATENT AND TRADEMARK OFFICE
CERTIFICATE OF CORRECTION

PATENT NO.: 5,891,588
DATED      :    April 6, 1999
INVENTOR(S): Sakai et al.

It is certified that errors appear in the above-identified patent and that said Letters Patent is hereby corrected as shown below:

Col. 2,    line 32, after "III" insert –occupied in the–;
line 33, change "tile" to –the–;
line 35, delete "rate";
line 36, after "the" insert –mixture solvent–;
line 38, change "tile" to –the–;
line 46, change "organized" to –organic–;
line 55, change "." to –,–.

Col. 13, line 27, after "organic" insert –solvent–.

Signed and Sealed this

Eleventh Day of July, 2000

Attest:

Q. TODD DICKINSON

*Attesting Officer*                    *Director of Patents and Trademarks*